Figure 1:
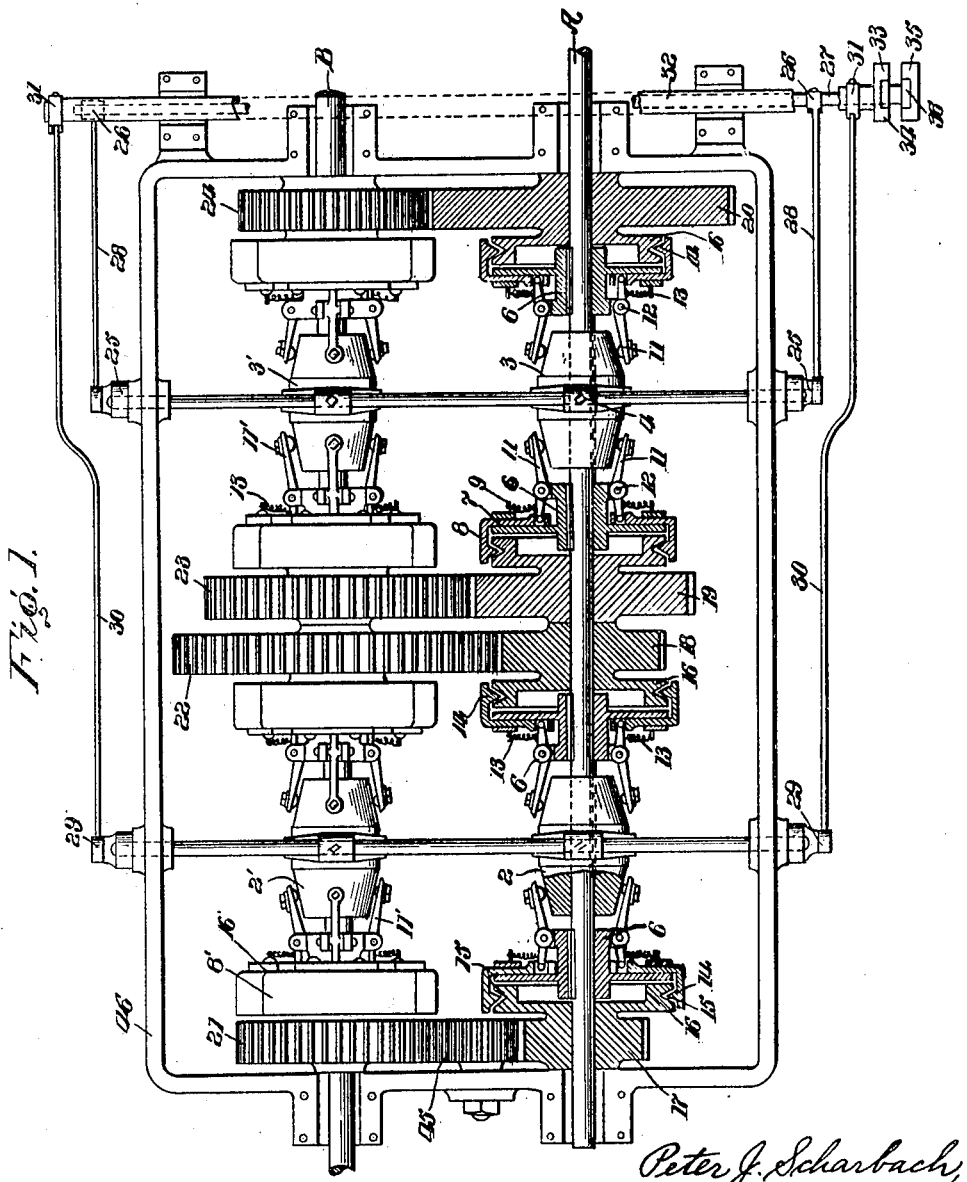

P. J. SCHARBACH.
CLUTCH.
APPLICATION FILED AUG. 5, 1911.

1,206,922.

Patented Dec. 5, 1916.
2 SHEETS—SHEET 1.

WITNESSES
M. E. Shook
Allan Hobson

Peter J. Scharbach,
INVENTOR

By Edson Bro's,
Attorneys.

P. J. SCHARBACH.
CLUTCH.
APPLICATION FILED AUG. 5, 1911.
1,206,922.
Patented Dec. 5, 1916.
2 SHEETS—SHEET 2.
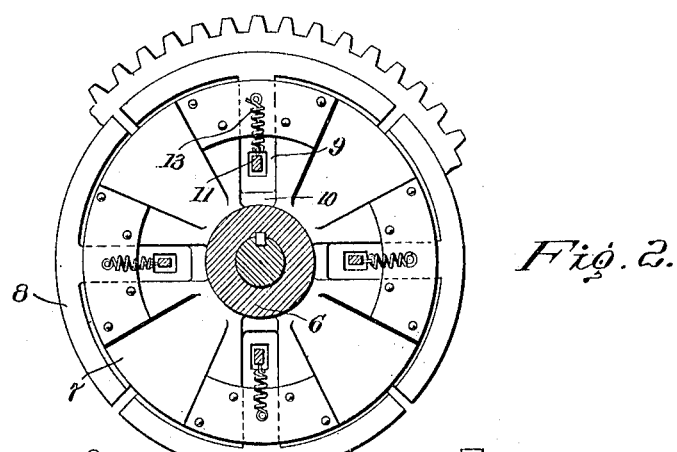
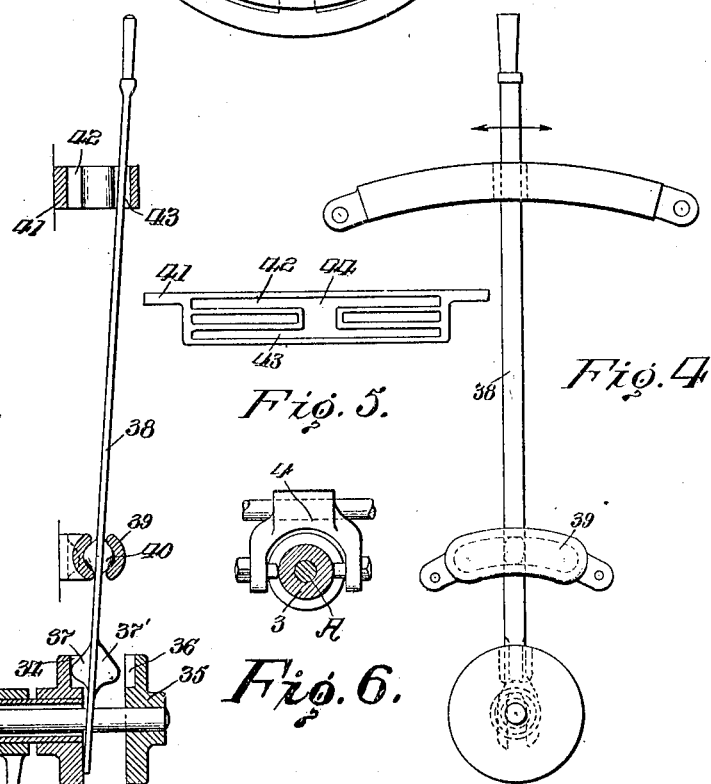
WITNESSES
M. E. Shook
Allan Hobson
Peter J. Scharbach,
INVENTOR
By Edson Bro's,
Attorneys.

UNITED STATES PATENT OFFICE.

PETER J. SCHARBACH, OF SAN FRANCISCO, CALIFORNIA.

CLUTCH.

1,206,922.  Specification of Letters Patent.  Patented Dec. 5, 1916.

Original application filed February 9, 1910, Serial No. 542,918. Divided and this application filed August 5, 1911. Serial No. 642,546.

*To all whom it may concern:*

Be it known that I, PETER J. SCHARBACH, a citizen of the United States, residing at San Francisco, in the county of San Francisco and State of California, have invented certain new and useful Improvements in Clutches; and I do hereby declare the following to be a full, clear, and exact description of the invention, such as will enable others skilled in the art to which it appertains to make and use the same.

My invention relates to improvements in clutches, especially designed for transmission gearing such as used on automobiles and other mechanically driven vehicles or machines wherein a change of speed and reverse of direction are required.

The invention has for its object to provide a clutch mechanism which is practically noiseless and whereby the speed of a driven shaft may be changed or its direction of rotation or travel reversed, without slowing up, or abating or changing the speed of the drive shaft, thereby permitting the shifting of the change speed gears, while the engine is running at a high, or any other rate of speed.

Further objects will become apparent from the following description.

The invention consists of the features of construction, including their arrangement, substantially as hereinafter fully described, and illustrated in the accompanying drawings and defined in the appended claims.

In the accompanying drawings:—Figure 1 is a plan view of the invention partly in section. Fig. 2 is a detail in elevation of the clutch mechanism. Fig. 3 is a side view partly in section of the operating lever. Fig. 4 is a front view of the same. Fig. 5 is a plan view of the slotted guide plate for the operating lever. Fig. 6 is a detail of the clutch lever.

In the accompanying drawings A designates a drive shaft and B a driven shaft. The shaft A is mounted in suitable bearings and is driven in any desired manner from a suitable source of power, but is usually connected direct to the crank shaft of an engine, not necessary to be shown. Splined on this drive shaft A to turn therewith, and arranged at convenient distances apart, are two sleeves 2 and 3, each of which is conically tapered at both ends. Each sleeve is adapted to be reciprocated longitudinally and independently on the splined portion of the drive shaft A by suitable means, as a clutch collar 4 fixed to respective rock-shafts 5'—5, in the well known manner common to clutch operations, the rock shafts 5—5' being actuated as will be later described.

Adjacent to each end of each of the conical sleeves 2—3 are collars 6 which are keyed to and revoluble with the drive shaft A. Each of the collars 6 is provided with a laterally extending disk 7 on which radially movable friction band shoes 8 are carried. These friction shoes 8 are constructed in the form of quadrants, as shown in Fig. 2, four of which are mounted on each disk 7 in the following manner: Each quadrant friction shoe 8 is provided with an extended vertical radial portion or plate 9, which is dovetailed into a corresponding radial slot 10 formed in the disk 7 and adapted to be reciprocated therein by means of a lever 11 pivoted at 12 to the collar 6, and having one end engaging a recess in the lower end of the plate 9; the opposite end of each lever extending over the conical portion of a slidable sleeve 3 (or 2) adjacent thereto. A tension spiral spring 13 is so disposed between each lever 11 and disk 7 as to normally retain each plate 9 and friction shoe 8 in the outermost position, shown in Figs. 1 and 2.

A V-rib 14 is formed on the inner side of each friction shoe 8, and is adapted to enter a corresponding continuous V-groove 15 formed in the periphery of a loose drum or friction clutch member 16, on shaft A, so as to grip the latter, when the friction shoes 8 are contracted, as later described. A drum 16 is provided for each set of friction shoes 8, in this case, four in number, and each drum 16 is formed with a gear wheel as 17, 18, 19 and 20, which latter are loosely mounted on the drive shaft A so that as the latter is rotated the gears 17, 18, 19 and 20 will remain stationary when the friction shoes 8 are out of contact with the drums 16. Gear 20 is the high speed gear, gear 19 the intermediate, gear 18 the slow, and gear 17 the reverse.

A driven shaft B is disposed in parallel relation to the drive shaft A and has four gears 21, 22, 23, 24, loosely mounted thereon, each of which is in constant mesh with a corresponding gear 17, 18, 19, 20 on the shaft A. Each gear 21, 22, 23, 24 on the shaft B is provided with a drum 16' in a like manner as the gears on the shaft A, and each drum is adapted to be clutched by friction shoes 8' through the action of levers 11', and conical sleeves 2', 3' on shaft B, in the same manner as described in reference to like parts on the drive shaft A.

The rock shaft 5 extends transversely above the sleeves 2, 3' and is adapted to actuate this pair of sleeves simultaneously and in unison, and the rock-shaft 5' is arranged in relation to the sleeves 2, 2' in the same manner.

The mechanism for operating the rock-shafts 5, 5' is constructed as follows:— Cranks 25 on the outer ends of the shaft 5 are connected with cranks 26 on a shaft 27 by links 28. Similar cranks 29 on the shaft 5' are connected by links 30 to cranks 31 on a tube 32 which is revolubly mounted on the shaft 27, slots being formed in the tube 32 through which the cranks 26 on the shaft 27 extend, the length of said slots being such as to permit either the shaft 27 or the tube 32 to be rotated a limited distance independently of the other.

One end of the tube 32 is provided with a collar 33, Fig. 3, having a vertically disposed groove or slot 34 formed on the outer side thereof. The end of the shaft 27 extends a suitable distance beyond the end of the tube 32 and has on its outer end a like fixed flange 35 which is slotted at 36 on its inner side opposite the slot 34 on the flange 33. The slots 34 and 36 are designed to receive the respective lugs 37 and 37' on opposite sides of a hand-lever 38, which is forked on the lower end to straddle the shaft 27, and extends between the flanges 33 and 35, and is adapted to be rocked back or forth on its bearing 39 in such manner as to engage the lug 37 with the flange 33, or the lug 37' with the flange 35 whereby either the tube 32 or shaft 27 is rotated, as later described.

The bearing 39 for the operating lever 38 consists of an elongated socket in which a ball or spherical member 40 on the lever 38 is mounted, the bearing 39 being slotted on its upper and lower sides so as to permit the lever 38 to be rocked back and forth or from side to side. The upper end of the lever 38 extends through a guide plate 41, which is provided with two parallel longitudinally disposed slots 42, 43 these slots being connected at their center by a transverse slot 44, in such manner that the lever 38 may be directed into either of the guide slots 42 or 43.

The gearing and clutch mechanism may be inclosed in any suitable casing, such as represented at 46.

The operation of the invention is as follows:—Assuming the parts to be in the positions shown in Fig. 1, and the hand lever 38 standing in a vertical position, as shown in Fig. 4, extending through the slot 44 in the guide plate 41; the drive shaft A is free to revolve without affecting either of the gears 17, 18, 19, 20, or the counter-shaft B, which latter may be connected to the running gear of a vehicle or other machinery in any suitable manner. With the parts in this position, the sleeves 6, with the shoes 8, and cones 2 and 3 revolve with shaft A, and the gears are stationary. Now, if it be desired to transmit power from the shaft A to the shaft B, on the slow speed transmission, for example, the operator throws the lever 38 sidewise into the slot 43 of the guide plate 41, which action causes the lug 37 on the lever 38 to engage the slot 34 in the flange 33 on the tube 32, and removes the lug 37' clear out of engagement with the slot 36 on the sleeve 35. The lever 38 then being moved forward in the slot 43 in the direction of the arrow, Fig. 4, the tube 32 will be caused to rotate in such manner as to rock the shaft 5' through the link 30 and cranks 29 and 31, so as to slide the conical sleeves 2 and 2' simultaneously in the direction of the arrows, Fig. 1. As the conical or tapered portion of the sleeves 2 and 2' are moved forward, the outer ends of the levers 11, corresponding to said cones, are forced outward so as to contract the friction shoes 8, in opposition to the springs 13, and clamp them in frictional engagement with the drums 16 and 16' respectively on the gears 18 and 22, thereby connecting the gear 18 to the shaft A and the gear 22 to the shaft B through the clutch mechanism so as to drive the shaft B in a direction opposite that of shaft A. If it is desired to reverse the direction of the shaft B, the lever 38 is moved to the opposite end of the slot 43, so as to turn the tube 32 in the reverse direction and throw the conical sleeves 2 and 2' in a direction opposite that just described to clutch the gears 17 and 21 to their respective shafts. An idle gear 45 being interposed between the gears 17 and 21, causes the latter to be rotated in a direction opposite that of the gear 17 on the shaft A. The high speed is transmitted to the shaft B from the shaft A through the gears 20 and 24, and an intermediate speed is given the shaft B through the gears 18 and 20. In order to throw in the high speed gears, the lever 38 is carried into the slot 42 through the slot 44, in such manner as to engage the lug 37' with the notch 36 in the disk 35 on the shaft 27, and move in such direction as to actuate the rock shaft 5 through the cranks 26 and 25 and the link 28, thereby throwing the clutch mechanism before described into engagement with the drums 16 on the gears 20 and 24. By moving the lever 38 into the opposite end of the slot 42, the clutch mechanism will be caused to engage the drums 16 on the gears 19 and 23. Thus, the tube shaft 32 controls the low speed and reverse, and shaft 27 controls the high and intermediate speeds.

From the foregoing it is apparent that but one set of gears can be thrown into engagement with the shafts A and B at the same time, as it is necessary to throw out the clutch mechanism on one set before another set can be operated. Each set of gears being always in mesh, there is no sliding or clash in changing from one speed to another, and, as all gears are loose on the shafts A and B only the set in operation will be at work, thus leaving the shaft free to rotate, as in a bearing, in the idle gears.

In cases of emergency the reverse gears may be employed as a brake to retard the forward movement of the machine, which is accomplished by applying the friction clutches on this set of gears slowly and allowing them to slip, thereby retarding the speed of the counter-shaft B.

It will also be noted that the clutch mechanism described may be instantly thrown in or out of driving connection, which is sometimes imperative in order to prevent accidents.

The clutching and unclutching operations may be performed instantly, substantially noiselessly, and with safety to the occupants of a vehicle and to the parts of the mechanism while the driving shaft is running at high speed, and the reverse gear may also serve the purposes of a brake by slowly engaging the clutch and permitting the parts to slip.

I claim:—

1. A clutch mechanism, including a rotary member, a shaft-carried sleeve having a disk or annular member, a shoe slidable upon said annular member and having an angular flange frictionally engaging the outer periphery of said rotary member for transmitting motion, a conical member applied to and rotatable with the shaft carrying said sleeve, and a resiliently-controlled lever fulcrumed upon said sleeve, said lever controlling said shoe and itself controlled by said conical member.

2. A clutch mechanism, including a rotary member, a shaft-carried sleeve having an annular member, a shoe adapted to extend beyond the periphery of said annular member and provided with an angular flange adapted to frictionally engage the outer periphery of the rotary member, said shoe having a slidable connection with said annular member, a conical member actuated by the shaft carrying said sleeve, and a resiliently controlled lever fulcrumed upon a part of said sleeve nearest to said conical member, said lever controlling said shoe and having one end engaging said conical member.

3. A clutch mechanism, including a rotary member having a V-shaped groove in its outer periphery, a shaft-carried sleeve having an annular member, a shoe having a peripheral flange equipped with a corresponding rib arranged to be received within said groove to serve as a guide against the lateral displacement of the shoe with relation to the rotary member, a conical member actuated by the shaft carrying said sleeve, and a resiliently-controlled lever fulcrumed upon said sleeve, said lever having connection with said slidable shoe at one end and engagement with said conical member at its other end.

In testimony whereof, I affix my signature, in presence of two witnesses.

PETER J. SCHARBACH.

Witnesses:
S. F. BOTTOMFIELD,
G. J. MANNGMAN.

Copies of this patent may be obtained for five cents each, by addressing the "Commissioner of Patents, Washington, D. C."